Dec. 31, 1946. H. L. SMITH 2,413,525
TOTALLY ENCLOSED DYNAMOELECTRIC MACHINE
Filed Feb. 10, 1944 3 Sheets-Sheet 3

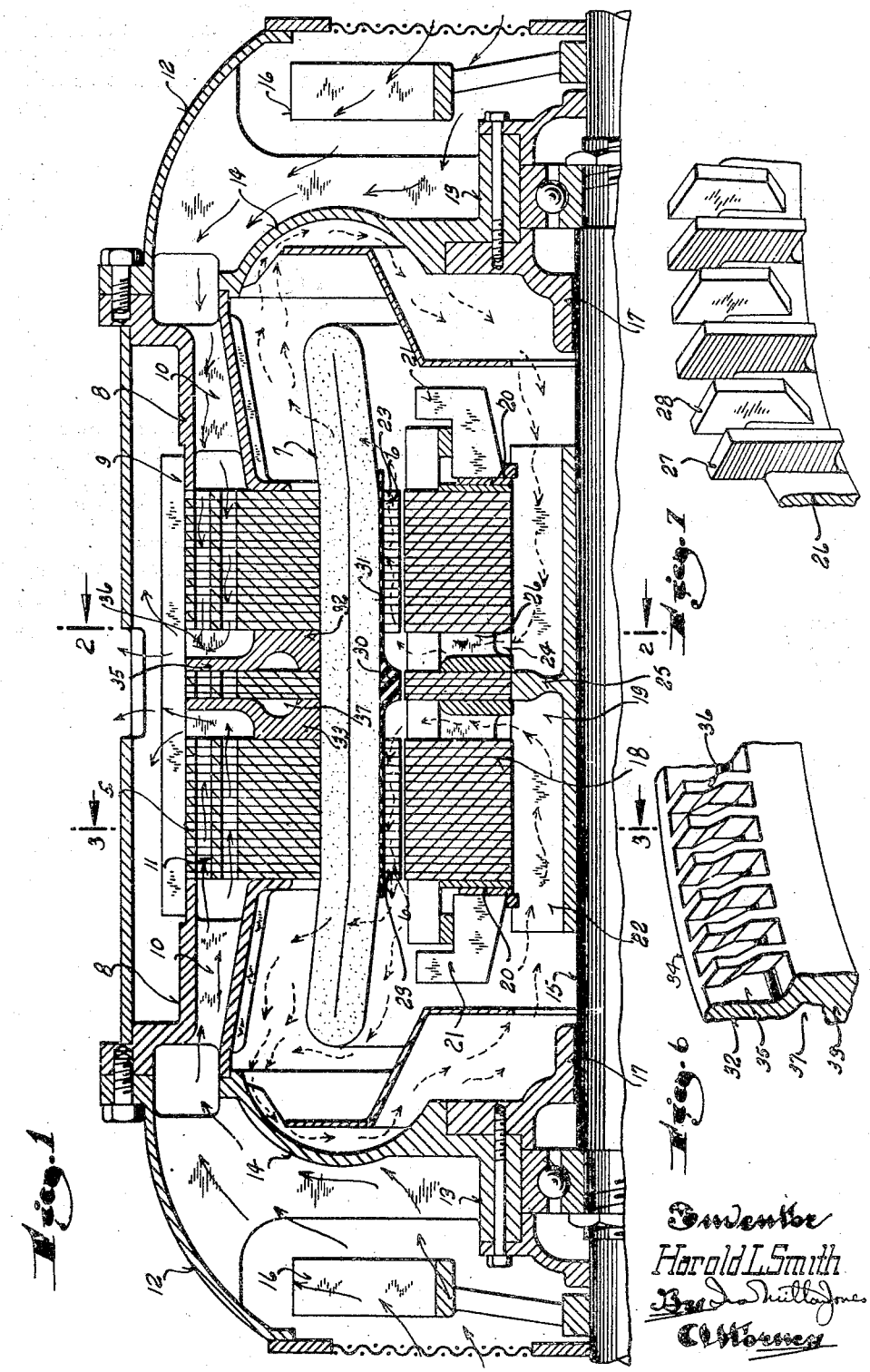

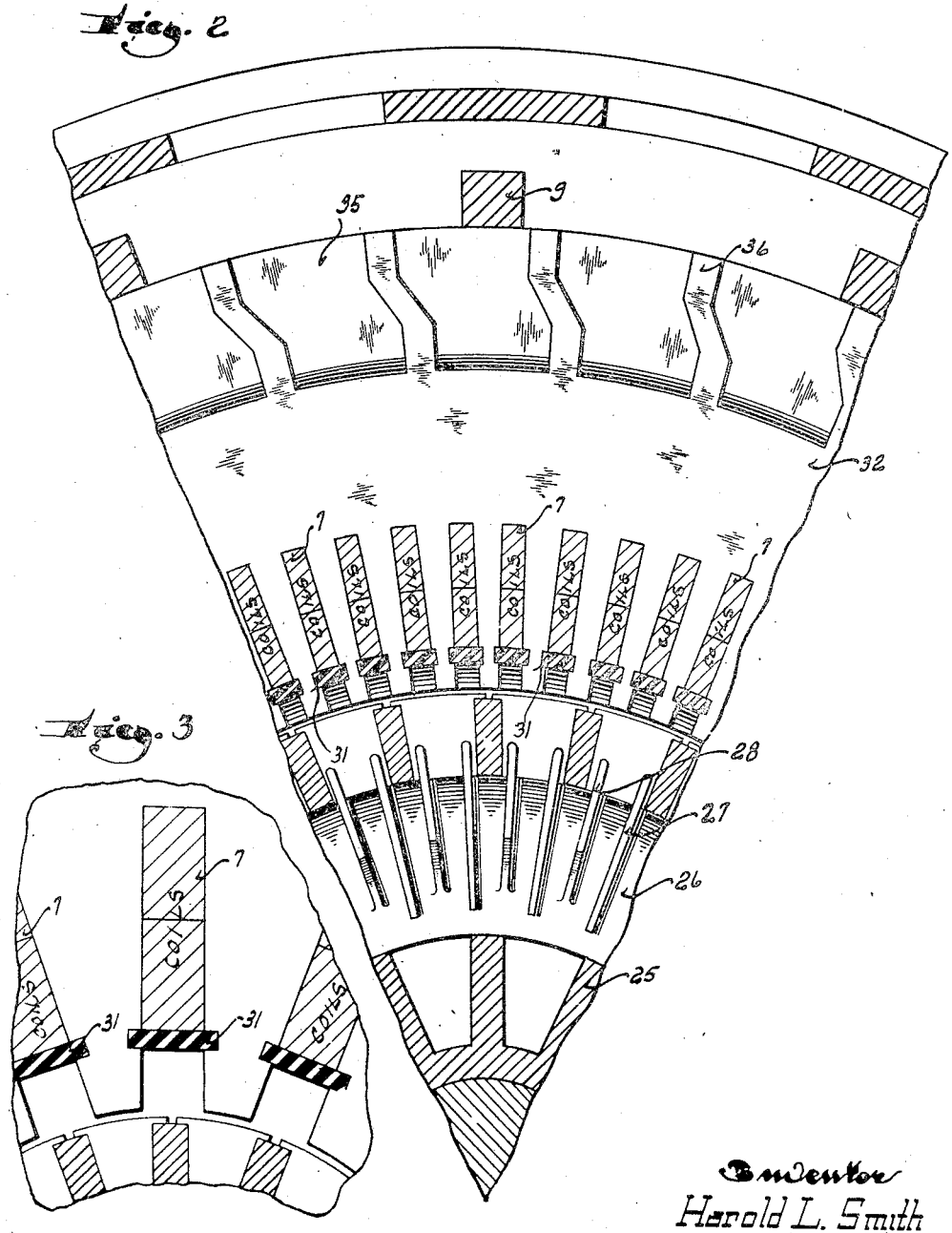

Inventor
Harold L. Smith
By ...
Attorney

Patented Dec. 31, 1946

2,413,525

UNITED STATES PATENT OFFICE 2,413,525

TOTALLY ENCLOSED DYNAMOELECTRIC MACHINE

Harold L. Smith, Milwaukee, Wis., assignor to The Louis Allis Company, Milwaukee, Wis., a corporation of Wisconsin Application February 10, 1944, Serial No. 521,756

5 Claims. (Cl. 171—252)

This invention relates to dynamo-electric machines and refers particularly to totally enclosed explosion proof electric motors of the type illustrated in the patent, No. 2,185,740, issued to Harold L. Smith January 2, 1940.

Experience has shown that with totally enclosed motors of the past rather high internal pressures are attained when these motors are tested with various mixtures of gasoline vapor and air. Inasmuch as the pressure developed during these tests determines the design of the structural parts of the motor to safely confine the developed pressure it follows that it is desirable to keep this pressure to as low a value as possible.

It has also been found that to a considerable extent the explosion pressure obtained depends upon the free internal volume of space inside the motor and the distribution of this space. In small motors which have solid stator and rotor cores, that is, devoid of axial air passages, so there is no communication between the two ends of the motor except the small space of the air gap between the rotor and stator, the explosion pressures produced are relatively low.

Where such small motors were provided with axial air passages or ducts which afforded definite communication between the two ends of the motor the pressures obtained on test were greatly increased.

Based upon these findings it is the object of the present invention to provide a dynamoelectric machine of the totally enclosed type wherein the internal free space is not only as small as possible, but wherein the free space at one end of the machine is isolated from the free space at the other end of the machine.

In other words, it is the object of this invention to provide a dynamoelectric machine which is adequately sealed against flame propagation from one end of the machine to the other, but at the same time has a system of ventilating ducts in the rotor and stator so constructed that heat generated in the rotor is adequately dissipated.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two examples of the physical embodiment of the invention constructed in accordance with the best modes so far devised for the practical application of the principles thereof, and in which:

Figure 1 is a longitudinal sectional view through one-half of a totally enclosed electric motor embodying this invention;

Figure 2 is a segment of a cross-sectional view through the motor on the plane of the line 2—2 in Figure 1;

Figure 3 is a fragmentary detail sectional view taken through Figure 1 on the plane of the line 3—3;

Figure 6 is a perspective view illustrating a portion of one of the blocking rings used in the stator core; and Figure 7 is a perspective view illustrating a portion of one of the blocking rings used in the rotor core.

Figure 4:
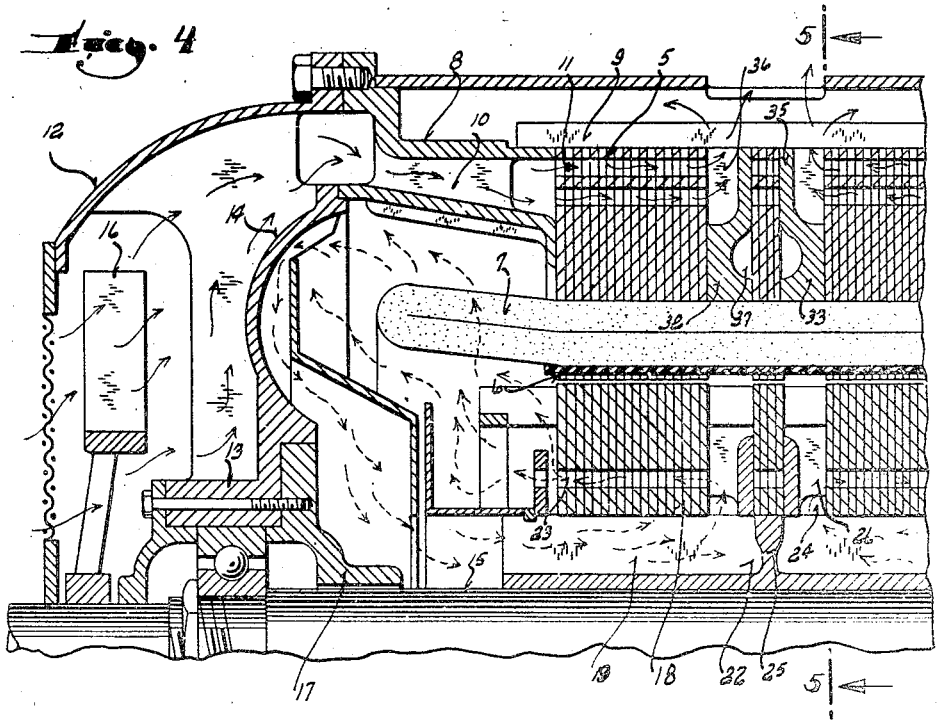
Figure 4 is a longitudinal sectional view similar to Figure 1, but illustrating a slightly modified embodiment of this invention.
Figure 5:
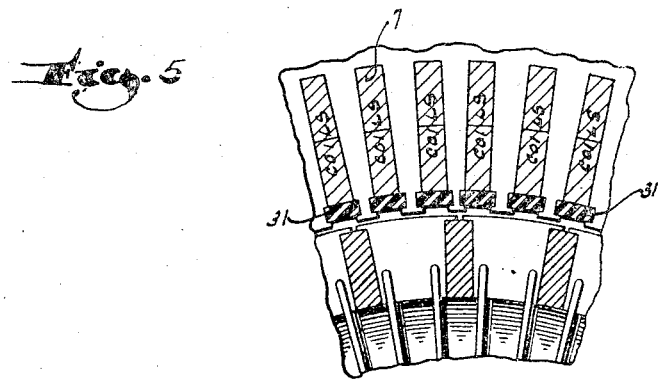
Figure 5 is a fragmentary detail cross-sectional view taken through Figure 4 on the plane of the line 5—5.

Referring now particularly to the drawings in which like numerals indicate like parts through the several views, the numeral 5 designates the stator core of the motor which, as is customary, is laminated and has coil slots 6 spaced circumferentially about its inner periphery to receive the stator windings 7.

The stator core is confined between two end rings 8 held together by circumferentially spaced bars 9 secured to the rings by welding or otherwise. The end rings 8 have spaced inner and outer circular walls connected by radial ribs 10. The space between the inner and outer walls of the end rings provides axial air passages leading from the ends of the motor to axial air passages 11 through the laminations of the stator core.

Secured to the end rings 8 are end bells 12 which are provided at their centers with bearings 13 in which the rotor is journaled. The end bells 12 have closed inner walls 14 which coact with the stator core, the end rings and the shaft 15 of the rotor to form a totally enclosed inner chamber. Outwardly of their walls 14 the end bells have a cored out structure to accommodate fans 16 which effect forced circulation of air from the ends of the motor over the walls 14 and through the axial air passages between the inner and outer walls of the end rings to the air passages 11 in the stator core.

From the description thus far it is evident that the closed inner chamber has only one possible opening to the atmosphere. This is the necessary clearance between the rotor shaft and the bearing. To guard against flame propagation through this slight space the bearing incorporates a guard portion 17 the bore of which is sufficiently long to extinguish any flame caused by explosion within the motor.

The rotor, like the stator, has a laminated core 18 which is mounted on a spiderlike hub 19 fixed to the rotor shaft. The rotor laminations are confined between end rings 20 secured to the hub 19 and provided with fan blades 21 which provide a forced circulation of air within the inner chamber. The path of the circulation set up by the fan blades 21 is partially defined by the axial air passages 22 between the arms of the spiderlike hub 19.

Radially outwardly of the axial air passages 22 are other circumferentially spaced axial air passages 23. In that embodiment of the invention illustrated in Figure 1, these other axial air passages are the unfilled portions of the coil slots 6, the slots being deep enough to accommodate the coils without being filled thereby. In that embodiment of the invention shown in Figure 4 these other axial air passages 23 are ports through the laminations of the rotor core.

The radially spaced inner and outer axial air passages 22 and 23 are connected at the center of the rotor by radial air passages 24 just as they are in the aforesaid patent. But, as distinguished from the ventilating system employed in said patent, the axial air passages in this instance are interrupted medially of their ends so as to completely isolate the air circulating in one end of the inner chamber from the air circulating in the other end thereof.

To this purpose the spiderlike hub 19 has the spaces between its arms closed by a transverse wall 25 and blocking rings 26 are interposed between the laminations opposite the transverse wall 25 and their adjacent laminations. These blocking rings, as best shown in Figure 7, have alternately long and short radial ribs or fins 27 and 28 to engage the adjacent faces of the rotor laminations and hold the same against deflection but spaced apart to define the radial air vents or passages 24.

In the construction shown in Figure 1 wherein the axial air passages 23 are formed by the coil slots 6 the radial air passages or vents 24 communicate with the passages 23 by extending to the outer periphery of the rotor; and in the construction shown in Figure 4 the passages 23 being cored openings through the rotor laminations, of course, open directly to the radial passages or vents 24.

In that embodiment of the invention shown in Figure 1 where the inner ends of the coil slots 6 provide the outer axial air passages of the inner enclosed chamber these slots must, of course, be closed opposite the transverse wall 25. A convenient manner of providing the necessary barrier is by forming an enlargement 30 on strips 31 inserted in the coil slots to hold the coils in place. The side edges of the strips are received in grooves in the side walls of the coil slots. If desired, the enlargements 30 need not be part of the strips 31 per se. They may be separate pieces inserted and held in place in the same way as the strips 31.

In operation the fans 21 set up a positive circulation of air in each end of the enclosed inner chamber to carry off the heat from the central hottest parts of the rotor without permitting flame propagation from one end of the enclosed chamber to the other.

The stator core has blocking rings 32 somewhat similar to the rings 26 inserted between its laminations directly opposite the rings 26. These blocking rings 32 have solid inner portions 33 and ribbed outer portions 34. The ribbed outer portions consist of a flat annular wall 35 and offset ribs or fins 36 extending outwardly therefrom with their edges forming planar extensions of the opposite face of the solid inner portion 33. The back of the solid portion 33 may be cored out as at 37 to reduce mass.

The rings 32 are disposed oppositely to each other so that the spaces between their ribs or fins 36 are in open communication with the inner ends of the axial air passages or ducts 11 to provide an outlet for these axial air passages permitting the discharge of the air circulated therethrough by the outside fans 16.

From the foregoing description taken in connection with the accompanying drawings, it will be readily apparent to those skilled in the art that this invention improves the design of totally enclosed electric motors by reducing the internal explosion pressures and that it accomplishes this objective without interfering with and, in fact, through an improvement in the circulation of cooling air within the interior of the enclosed chamber and also over the exterior thereof.

What I claim as my invention is:

1. In a dynamoelectric machine: a stator having a laminated core; a rotor having a laminated core revolving within the stator core; means coacting with the stator core to form a totally closed inner chamber confining the rotor core and the inner portion of the stator core; means defining an inner axial air passage through the rotor; means defining axial air passages extending through the inner peripheral portions of the stator core; means medially of the ends of the cores including a ring member confined between laminations of the rotor core for blocking said axial air passages and thereby isolating the air within one end of the inner chamber from the air in the other end thereof; and means on the rotor core defining radial air passages connecting said inner axial air passage of the rotor core with the axial air passages of the stator core to enable the circulation of air through said connected axial and radial air passages.

2. In a dynamoelectric machine: a stator having a laminated core; a rotor having a laminated core revolving within the stator core; means coacting with the stator core to form a totally enclosed inner chamber confining the rotor core and the inner portion of the stator core; means defining inner axial air passages through the rotor; means defining axial air passages extending through the inner peripheral portions of the stator core and spaced radially out from said inner axial air passages of the rotor; means carried by the stator and rotor blocking said axial air passages medially of their ends to isolate the air within one end of the chamber from the air in the other end thereof; means on the rotor defining radial air passages connecting said inner axial air passages of the rotor with the axial air passages of the stator to enable the circulation of air through said connected axial and radial air passages; and means revoluble with the rotor for effecting a positive circulation of air through the inner axial air passages thereof to said radial air passages and out through said axial air passages of the stator.

3. In a dynamoelectric machine of the totally enclosed type: a laminated stator core; a rotor having a laminated core rotatable within the stator; means coacting with said stator core to define a totally enclosed inner chamber confining the rotor core and the inner portion of the stator core; means defining axial air passages through the stator and rotor core structures within said enclosed chamber, said stator passages being adjacent to the inner periphery of the stator laminations; means defining axial air passages across the outer surface of the inner chamber and through the laminations of the stator core adjacent to the outer periphery thereof; means on the stator and rotor blocking said air passages medially of their ends to isolate the air both internally and exteriorly at one end of the machine from the air at the other end of the machine; means on the rotor adjacent to said blocking means defining radial air passages connecting the inner stator and rotor passages; means on the stator adjacent to the blocking means thereon defining radial air passages for conducting air circulating in said outer passages from the ends of the machine to the outer periphery of the stator; and means for effecting circulation of air through said axial and radial air passages.

4. In a dynamoelectric machine: a stator having a laminated core provided with coil slots spaced circumferentially about its inner periphery; coils in said slots, said slots being deep enough so that the coils do not fill the same whereby the unfilled portions of said slots provide axial air passages through the machine; a rotor having a laminated core rotatable within the stator core; means defining an axial air passage through the central portion of said rotor core; means blocking said axial air passage at the center of the rotor core to preclude air flow entirely through the rotor; means at opposite sides of said blocking means but adjacent thereto defining radial air passages connecting with said central axial air passage and leading to the outer periphery of the rotor to connect with the axial air passages defined by the unfilled portions of the stator slots; and means wholly filling the stator slots in line with said blocking means inwardly of the stator coils so as to interrupt the continuity of air passages in the stator and thus substantially preclude the flow of air through the stator slots from one end of the machine to the other.

5. In a dynamoelectric machine: a stator having a laminated core provided with coil slots spaced circumferentially about its inner periphery; coils in said slots, said slots being deeper than required to receive the coils so that the coils do not fill the slots and the unfilled portions of the slots provide axial air passages, the sides of the slots having grooves; strips inserted in said grooves and spanning the slots to confine the coils therein; and enlargements on said strips wholly closing the slots in the central laminations to interrupt the continuity of the axial air passages formed by the unfilled portions of said slots and thus preclude the flow of air through the slots from one end of the machine to the other.

HAROLD L. SMITH.